US012775688B2

(12) United States Patent
Ponnivalavan et al.

(10) Patent No.: US 12,775,688 B2
(45) Date of Patent: Oct. 27, 2026

(54) USER IDENTITY VALIDATION

(71) Applicant: Microsoft Technology Licensing, LLC, Redmond, WA (US)

(72) Inventors: Arulanandan Ponnivalavan, Karnataka (IN); Vishal Goyal, Delhi (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 127 days.

(21) Appl. No.: 18/680,051

(22) Filed: May 31, 2024

(65) Prior Publication Data

US 2025/0371117 A1 Dec. 4, 2025

(51) Int. Cl.
*G06F 21/31* (2013.01)

(52) U.S. Cl.
CPC .................................... *G06F 21/31* (2013.01)

(58) Field of Classification Search
CPC ...... G06F 21/31; G06F 21/45; G06F 21/6277; G06F 40/40; G06F 40/279; H04L 63/08; H04L 63/10; H04L 63/083; H04L 63/102; H04L 63/0807; H04L 63/0838; H04L 63/0892; G06N 5/02
USPC ............................................................ 726/18
See application file for complete search history.

(56) References Cited

U.S. PATENT DOCUMENTS

| | | | | |
|---|---|---|---|---|
| 7,661,124 | B2 * | 2/2010 | Ramanathan | H04L 41/0894 713/182 |
| 10,594,674 | B1 * | 3/2020 | Chen | H04L 63/08 |
| 11,818,159 | B2 * | 11/2023 | Miller | G06N 5/04 |
| 12,242,981 | B1 * | 3/2025 | Fouse | G06F 40/30 |
| 2014/0075014 | A1 * | 3/2014 | Chourey | G06Q 30/02 709/224 |
| 2015/0207789 | A1 * | 7/2015 | Kumar | H04L 63/08 726/6 |
| 2018/0260715 | A1 * | 9/2018 | Yan | G06N 20/00 |
| 2020/0226479 | A1 * | 7/2020 | Germanakos | G06F 11/3688 |
| 2021/0073359 | A1 * | 3/2021 | Boodaei | H04L 9/0844 |
| 2023/0222527 | A1 * | 7/2023 | Singavarapu | G06Q 30/01 705/7.31 |
| 2024/0146734 | A1 * | 5/2024 | Southgate | G06F 21/6227 |
| 2024/0220600 | A1 * | 7/2024 | Maiman | G06F 21/31 |
| 2024/0333699 | A1 * | 10/2024 | Narendranathan | G06F 40/40 |
| 2024/0354320 | A1 * | 10/2024 | Procter | G06F 16/3334 |
| 2024/0412720 | A1 * | 12/2024 | Vasylyev | G06F 16/90332 |
| 2025/0103828 | A1 * | 3/2025 | Del Vecchio | G06F 40/40 |
| 2025/0200210 | A1 * | 6/2025 | Icacan | G06F 9/451 |

(Continued)

OTHER PUBLICATIONS

"Question Generation For Retrieval Evaluation", accessed on link https://mlflow.org/docs/latest/llms/rag/notebooks/question-generation-retrieval-evaluation.html, retrieved on May 14, 2024, 14 pages.

(Continued)

*Primary Examiner* — James N Fiorillo
(74) *Attorney, Agent, or Firm* — Alleman Hall LLP

(57) ABSTRACT

A data item is obtained that is representative of an activity associated with a legitimate user. A fact is derived from the data item and a question about the activity associated with the legitimate user activity is generated from the fact. An expected answer to the question is also generated based on the fact, and compared with an end-user response to the question in an end-user authentication process. In certain implementations, Large Language Models (LLM) are used to aid the user authentication process.

20 Claims, 8 Drawing Sheets

(56) References Cited

U.S. PATENT DOCUMENTS

| | | | | |
|---|---|---|---|---|
| 2025/0247394 | A1* | 7/2025 | Pande | G06Q 10/0635 |
| 2025/0259255 | A1* | 8/2025 | Penrose | G06F 16/71 |

OTHER PUBLICATIONS

"Security planning for LLM-based applications", accessed on link https://learn.microsoft.com/en-us/ai/playbook/technology-guidance/generative-ai/mlops-in-openai/security/security-plan-llm-application, Apr. 27, 2024, 16 pages.

Ayala, Freddy., "Security Best Practices for GenAl Applications (OpenAI) in Azure", accessed on link https:// techcommunity.microsoft.com/t5/azure-architecture-blog/security-best-practices-for-genai-applications-openai-in-azure/ba-p/4027885, Jan. 16, 2024, 13 pages.

Extended European search report received in European Application No. 25179989.6, mailed on Aug. 14, 2025, 10 Pages.

Santi, Jim., "How ChatGPT/LLM capabilities can dramatically improve digital identity and authentication", accessed on link https://www.linkedin.com/pulse/how-chatgptllm-capabilities-can-dramatically-improve-jim-delli-santi, May 25, 2023, 6 pages.

Shah, et al., "Using Large Language Models to Generate, Validate, and Apply User Intent Taxonomies", arXiv:2309.13063v2, Feb. 1, 2024, 11pages.

Siddavatam, et al., "Authentication Using Dynamic Question Generation", Springer, 2019, pp. 293-300.

* cited by examiner

USER IDENTITY VALIDATION

TECHNICAL FIELD

The present disclosure pertains generally to system security, and in particular to methods, systems and computer programs for validating an identity of a user.

BACKGROUND

User validation in any application or service has traditionally been performed through the use of usernames and passwords. But since passwords are susceptible to being leaked, multi-factor authentication methods like one-time codes, biometrics etc. have gained popularity. However, even these methods are slowly becoming vulnerable as well. For example, one-time codes can be obtained illegitimately if a person's mobile device gets stolen. Similarly, biometric credentials could be obtained from people while they are unaware. So, the problem of user validation requires newer ways of checking the end-user's identity.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Nor is the claimed subject matter limited to implementations that solve any or all of the disadvantages noted herein.

In one aspect herein, a data item is obtained that is representative of an activity associated with a legitimate user. A fact is derived from the data item and a question about the activity associated with the legitimate user activity is generated from the fact. An expected answer to the question is also generated based on the fact, and compared with an end-user response to the question in an end-user authentication process.

BRIEF DESCRIPTION OF FIGURES

Particular embodiments will now be described, by way of example only, with reference to the following schematic figures, in which.

DETAILED DESCRIPTION

Figure 1A:
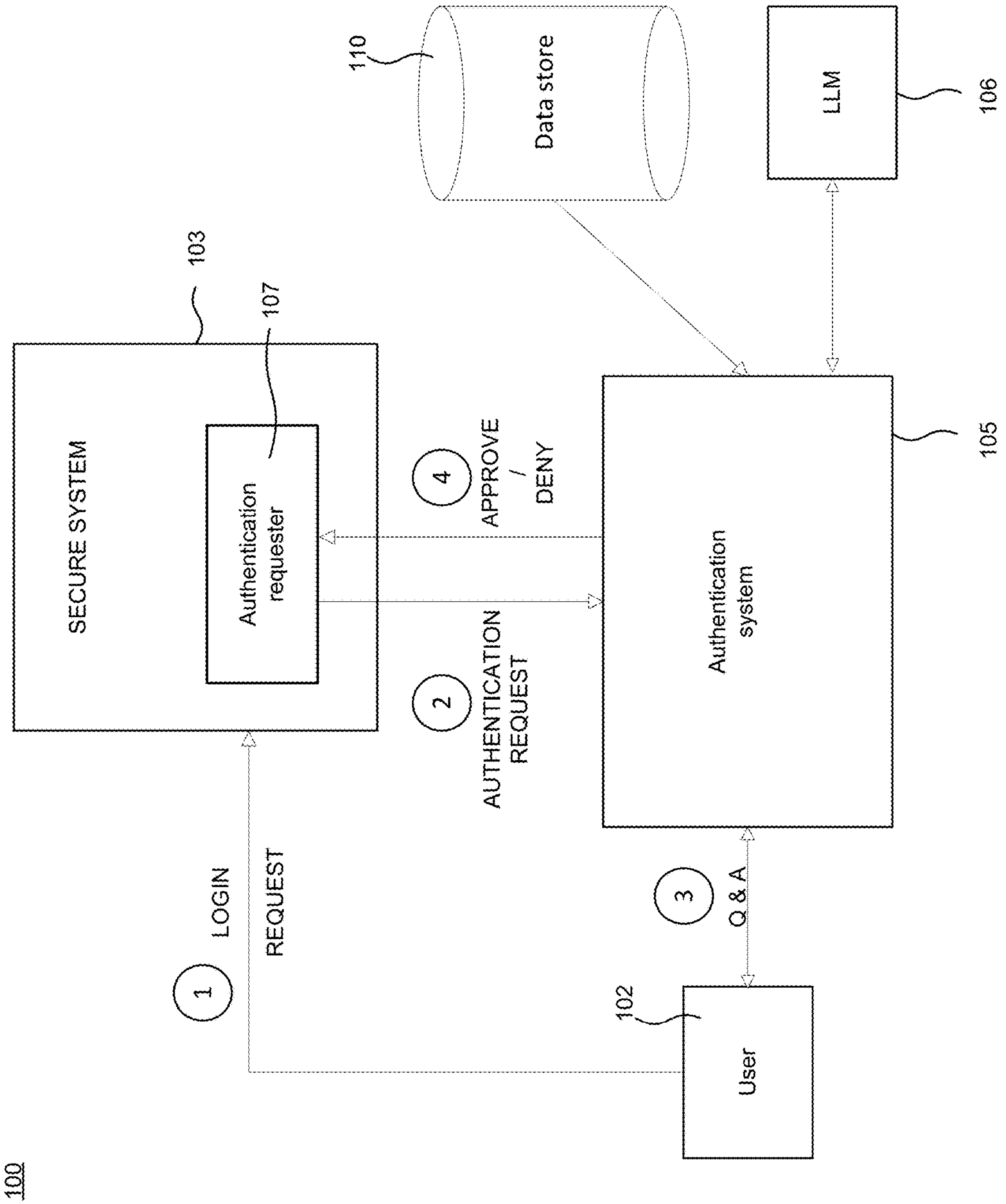
FIG. 1*a* shows a block diagram illustrating an example user identification validation system.

Conventional authentication techniques may effectively relate to "What-we-know" (e.g. passwords or other secret information held by the user), or "What-we-are" (e.g. such as biometrics), or "What-we-have" (e.g. smart-cards or other identification tokens that the user may carry), etc. Example embodiments described herein make use of another paradigm, namely "What-we-did". The technical solution presents a question to an end-user which is based on a legitimate user's past activity accessible by a service provider. Based on the user response to the question, the solution can give an output, with a particular confidence level, on whether the user is who or what they claim to be. In certain implementations, Large Language Models (LLM) are used to aid the user authentication process, for example in generating questions and/or evaluating answers about past activity.

The example methods described below allow the validation of the identity of a user seeking access to a secure system function. It is assumed that a data service provider has access to user data containing information about the activity associated with a legitimate user. An unverified user seeking access to the secure system function is asked a number of identity verification questions based on stored information relating to the activity associated with a legitimate user of the system. Based on the responses of the unverified end user (seeking access to the secure system) to each one of the identity verification questions presented, a score is calculated. This score could be an average score of the different scores obtained by answering the individual identity verification questions. The score is used to validate the identity of the user seeking access to the system and to determine whether to grant access or deny access to such a user. By improving the robustness of user identify verification in this manner, a consequent improvement in the security of the secure system is obtained. More generally, improvements in system security are obtained by determining an authentication outcome based on a comparison of an expected answer to a question about a legitimate user's past activity with and-end users' actual response. In some embodiments, the methods presented herein, describing user identity validation based on user activity, are applied on their own. In other embodiments, in the methods are applied in conjunction with other user identity validation processes such as a credential-based authentication (e.g. username-password) or biometric validation. The unverified user does not directly interact with any of the data service providers in the system, so unverified user's responses to the verification questions are parsed and secured before passing them to different data providers (large language model (LLM), enterprise data provider, non-enterprise data provider etc etc.) to prevent any cyber-attacks on the data providers (the user is prevented from running any custom queries for the LLM). This separation of the data service providers and the LLM from the end-user provides an additional layer of security, thus yielding a further improvement in overall system security. In this regard, in some embodiments, an authentication system performing the authentication process uses an LLM to perform an authentication-related function or functions such as deriving a fact from a data item, generating a question-answer pair from a fact, performing a comparison between an end-user response and an expected answer etc. Such interactions with the LLM are handled by the authentication system, and can therefore be tightly controlled, and do not require an interface to the LLM to be exposed to the end-user.

FIG. 1*a* shows a block diagram illustrating a user identification validation system 100. Example steps performed within the system 100 are enumerated 1 to 4. An end user 102 seeks to access to a system function 101 of a secure system 103. To do so, the end user 102 initiates a login request to secure system 103 in Step 1. In one deployment scenario, the user 102 initiates the login request from a user device remote from the security system 103. In that event, the login request is sent from the user device to the secure system via a network. In another deployment scenario, the secure system 103 is a system (e.g. user device) local to the user 102. The system function 101 can be any functionality that is secured based on identity verification, such as a data access function or data storage function, a messaging function, a gaming function or other application function etc.

In response to receiving the login request from user 102, an authentication requester 107 of the secure system 103 initiates an authentication request to an authentication system 105 in step 2. The authentication request is an instruction asking that the identity of end user 102 be verified. An authentication request in respect of an end user is referred to as an end-user authentication request. The authentication requester 107 is a functional component of the secure system 103 in communication with the authentication system 105 for this purpose. In one embodiment, the authentication system 105 is local to the secure system. (In one example, the secure system 103 and authentication system is embodied in the same computer device). In some such embodiments, the authentication system 105 is part of the secure system 103, in which case the authentication request is an internal signal within the secure system 103 between the authentication requester 107 and the authentication system 105. In another embodiment, the authentication system 105 is remote from the secure system 103 and communication between the authentication requester 107 and the authentication system 105 is conducted remotely. The authentication system 105 conducts a user identification validation process using data of a legitimate user of secure system 103. Such data is referred to herein as legitimate user data. The data of the legitimate user of secure system 103 is stored in data store 110. Based on the data of the legitimate user stored in data store 110, the authentication system generates user identification questions to be asked to the end user 102. In some embodiments, the authentication system 105 also uses a LLM 106 in the user identification validation process to generate user identification questions. In step 3, the authentication system 105 presents the identification questions to the end user 102, and receives the respective responses of the end user 102. Bases on these responses, the authentication system 105 determines whether the login request of end user 102 to secure system 103 should be approved or denied. In step 4, the authentication system 105 communicates the outcome of the user identity validation process to the secure system 103.

Figure 1B:
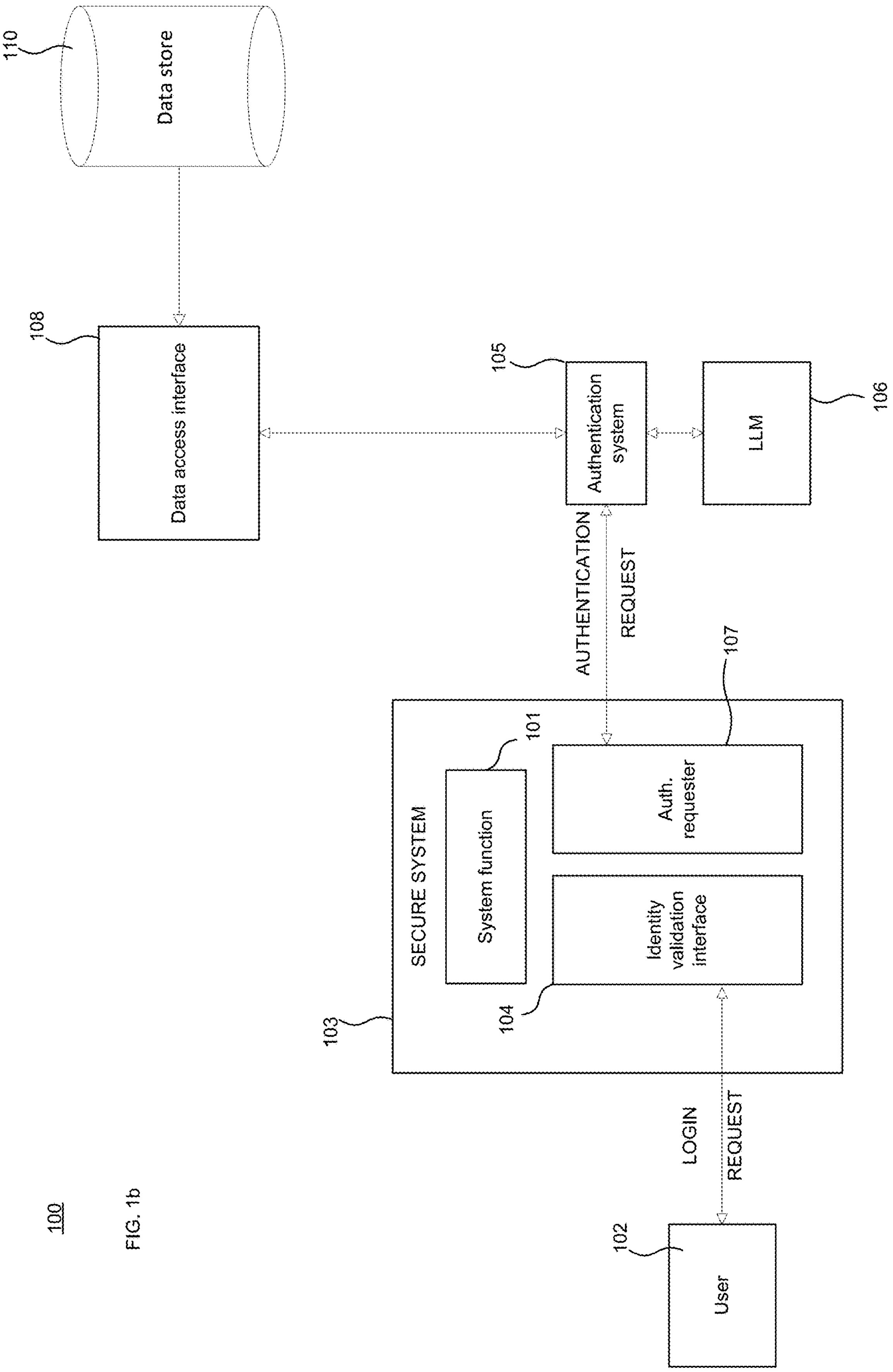
FIG. 1*b* shows a block diagram illustrating one example implementation of a user identification validation system.

FIG. **1*b* shows a block diagram illustrating further details of the user identification validation system 100 in one possible implementation. As in FIG. 1*a*, the end-user 102 seeks to use the system function 101 of the secure system 103. The user 102 interacts with an interface 104 of secure system 103 by providing information, for example, to request access to secure system 103, or to respond to an identity verification request from secure system 103. In some examples, the interface 104 is a graphical user interface GUI which displays fields where the user inputs information via a user input device. In the implementation of FIG. 1*b*, the user interface 104 is shown as part of the secure system 103. In another implementation, the user interface is remote from the secure system 103, e.g. implemented at a user device remote from the secure system 103. In the latter case, information is caused to be outputted by transmitting a message or messages conveying the information from the secure system 103 to the remote user device. In some examples, the interface 104 interacts with the user 102 by displaying information, for example, to request identity verification, or to display the result of an identity verification request. In some embodiments, the secure system 103 interacts with the authentication system 105, for example, to process an authentication request. In some embodiments, the authentication system 105 also interacts with a LLM 106, for example to exchange information about an authentication request. The authentication system 105 can also interact with a data access interface 108. The data access interface 108 may be an interface to an online data repository (such as Microsoft SharePoint, Google Workspace, Apple iCloud, Dropbox etc.) or messaging system (e.g. email system such as Microsoft Outlook, Gmail etc.). In some embodiments, the data access interface 108 interacts with authentication system 105, for example, to provide information regarding a legitimate user of the secure system 103. The data access interface 108 has access to data stores containing user activity information such as emails, documents, repositories, pull-requests, dashboards etc., belonging to a legitimate user of the secure system 103. In one embodiment the data access interface 108 is separate from the secure system 103. In another embodiment, the data access interface 108 is hosted on the secure system 103 itself. In either case, the data access interface 108 and data store 110 may be local to or remote from the authentication system 105 (which, as noted, may itself be local to or remote from the secure system 103**).

In some implementations, the authentication system 105 takes the form a remote authentication service, separate from the system being accessed. In some examples, the remote authentication service hosts an authentication module that implements the "What-we-did" authentication functionality described herein. In some such implementation, the authentication service hosts additional authentication module(s). The secure system 103 being accessed receives a login request and then in response passes it on to the authentication system 105 (makes the authentication request). However it is implemented, the authentication system 105 comprises logic that generates questions and assesses the end-user responses, and subsequently approves or denies the request and reports back to the authentication requester 107.

In some embodiments, the authentication request is binary (approving or rejecting the authentication request). In other embodiments, the authentication request is non-binary. For example, an additional category or categories may be included to indicate that further authentication information is needed. In some such examples, the authentication outcome indicates that an additional authentication mode (e.g. biometric, credential-based) is required, e.g. because the question-based authentication has yielded an insufficient confidence level to approve the authentication request outright.

The authentication requestor 107 generates the end-user authentication request in response to an attempt by an end-user to access the secure system function 101 (referred to as an end-user authentication attempt). Based on the authentication outcome, the authentication requestor 107 permits or denies the end-user access attempt. In some embodiments (e.g., with a non-binary authentication outcome), there are situations in which the access attempt is denied initially, but the authentication process continues and the end-user is given an opportunity to provide additional authentication information. In some such examples, an additional question or question(s) is presented to the user, or an additional authentication function (e.g., biometric, credential-based etc) is instigated (e.g. which is indicated in the authentication outcome). In other embodiments (e.g. with a binary authentication outcome), either the access attempt is granted, or the access attempt is refused and the authentication process is terminated.

In one implementation, the user identification validation system is implemented on a distributed computer system. In some examples, the distributed computer system comprises a central system, which is, for example, operated by a security provider, and a local system which is, for example, operated by a user supported by the security provider. The system is local from the user's perspective, and remote from the security provider's perspective. In such a distributed system, the central system and local system are separate systems with mechanisms used to limit transmission of data between the systems.

The data access interface has access to user data containing user activity information. For example, an enterprise data provider may have access to user activity through data stores containing emails, documents, repositories, pull-requests, dashboards etc., belonging to a legitimate user of the system. Similarly, a non-enterprise data provider such as a gaming console operating system may have access to the gaming activity of a legitimate user of the gaming console.

Data items, as described herein, are in some embodiments obtained from one or more sources of user data (data sources), such as metadata contained in the data source(s). One example of data source is an email or other form of electronic message. In the case of an email, data items can be obtained from an email title. For instance, the data item "Travelling on $20^{th}$ March, will be Out of office" may be obtained from the title of an email. Another example of a data source is a code repository, and a data item may be obtained from a pull-request that the user created on the code repository. For instance, the data item "[BugFix] False User warning affecting 100+ customers" may be obtained from a pull-request title. Other examples include the date of modification of documents, who documents were sent to (and when), date documents were uploaded to a share point or other systems, date documents were shared etc, or more generally anything representative of some action the (legitimate) user has taken in the past.

Figure 2:
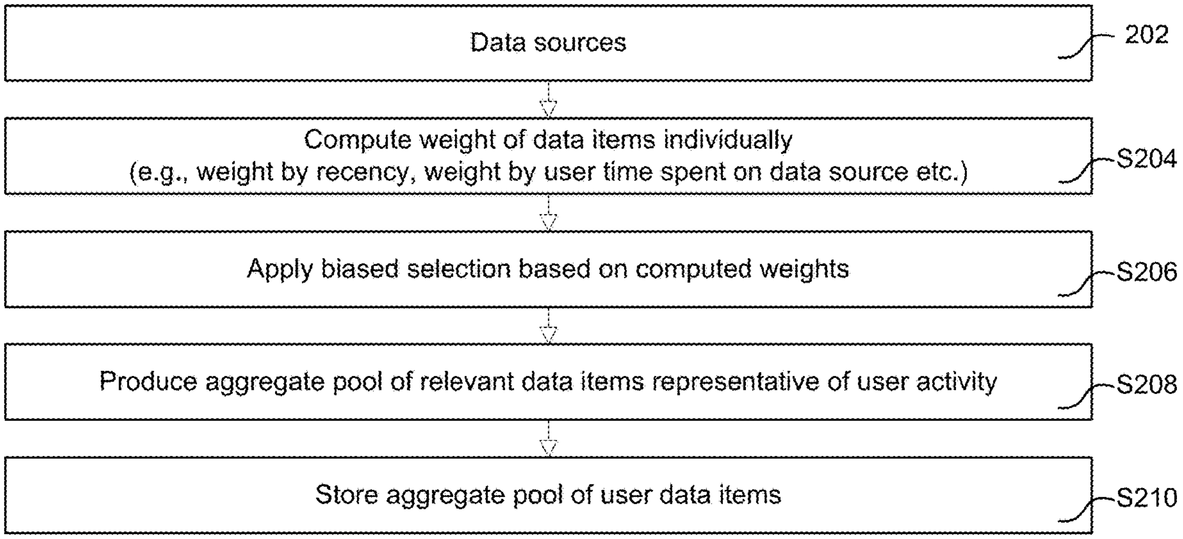
FIG. 2 shows a flow chart illustrating an example method of obtaining an aggregated pool of data items representative of user activity.

FIG. 2 shows a flow chart illustrating a method of obtaining an aggregated pool of data items representative of user activity. The method is applied to one or more data sources 202 received as input. The data sources 202 are sources of information regarding the activity associated with a legitimate user. In step S204, an importance weight is computed for every data item available from the data sources 202. The importance weight is representative of the importance of the data item in the user identification validation process. In one example, the importance weight of a data item is representative of how recently the legitimate user data item created or interacted with an item. In the case of an e-mail for instance, the importance weight could be dependent on the date on which the email was sent. In another example, the importance weight of a data item is representative of an interaction time, meaning a recorded amount of time the legitimate user spent on creating or otherwise interacting with the data item. In the case of an email for instance, the importance weight could be dependent on the time taken by the legitimate user to write the email. In step S206, a list of data items are selected from the items available from the data sources 202. The selection is biased based on the computed importance weights, such that data items with a higher importance weight are more likely to be selected. For example, where the importance weight is representative of the recency of a data item, a more recent data item is more likely to be selected than a less recent one. A recency importance weighting makes it more probable for the legitimate user to remember details of the activity contained in the data items used in the identity verification process. An admin can configure which items to select; for example, an admin can configure to only select facts from the email data. In step S208, the selected data items are aggregated to form an aggregate pool of data items representative of user activity to be used in the user identification validation process. Optionally, the aggregate pool of selected data items is stored in step S210 for use in response to a user authentication request. Alternatively, the aggregate pool of data items is be created as in steps S204-S208 upon receipt of a user authentication request.

The data items obtained from user data is in turn used in deriving facts representative of the user activity. For example, for the data item "Travelling on 20th March, will be Out of office", example facts are "The date of travel is on 20th March", or "The person will be out of the office that day".

In some examples, facts are in turn be used to derive key-phrases, for example by the removal of stop-words. In the example of the fact "The date of travel is on $20^{th}$ March", example key-phrases are "date", "travel" "$20^{th}$ March". In some examples, an algorithm such as a sorting mechanism is used to select a single unique key-phrase in the case of multiple key-phrases derived from one fact. In some examples, only facts which give unique key-phrases are used. In some examples, the selected unique key-phrase is used to generate a user identification validation question, and/or as an answer to a user identification validation question.

In one example, a user identification validation question is generated based on a fact derived from a data item representative of the activity associated with a legitimate user of the system. In another example, a user identification validation question is generated based on a unique key-phrase extracted from such a fact. A pre-defined template or an LLM may be used to generate a user identification validation question from a fact or a key-phrase derived thereof. In some examples, an LLM is instructed to generate a question which has the answer "The date of travel is on $20^{th}$ March" using past-tense. In response to such an instruction, the LLM could generate the question, "When was the data of travel?".

The existing solutions using questions for user authentication have a fixed set of questions asked to validate the user. These questions are usually of the type "What is your nickname", "Which city you were born in" etc. On the other hand, the solution proposed could ideally have an infinite set of questions, based on the amount of user data existing in the data sources, such as an enterprise domain. The existing solutions have questions which have static answers. Answers to questions like "What is your nickname", "Which city you were born in" etc. are usually static. The proposed solution on the other hand, requires appropriate context and can change over time.

Figure 3:
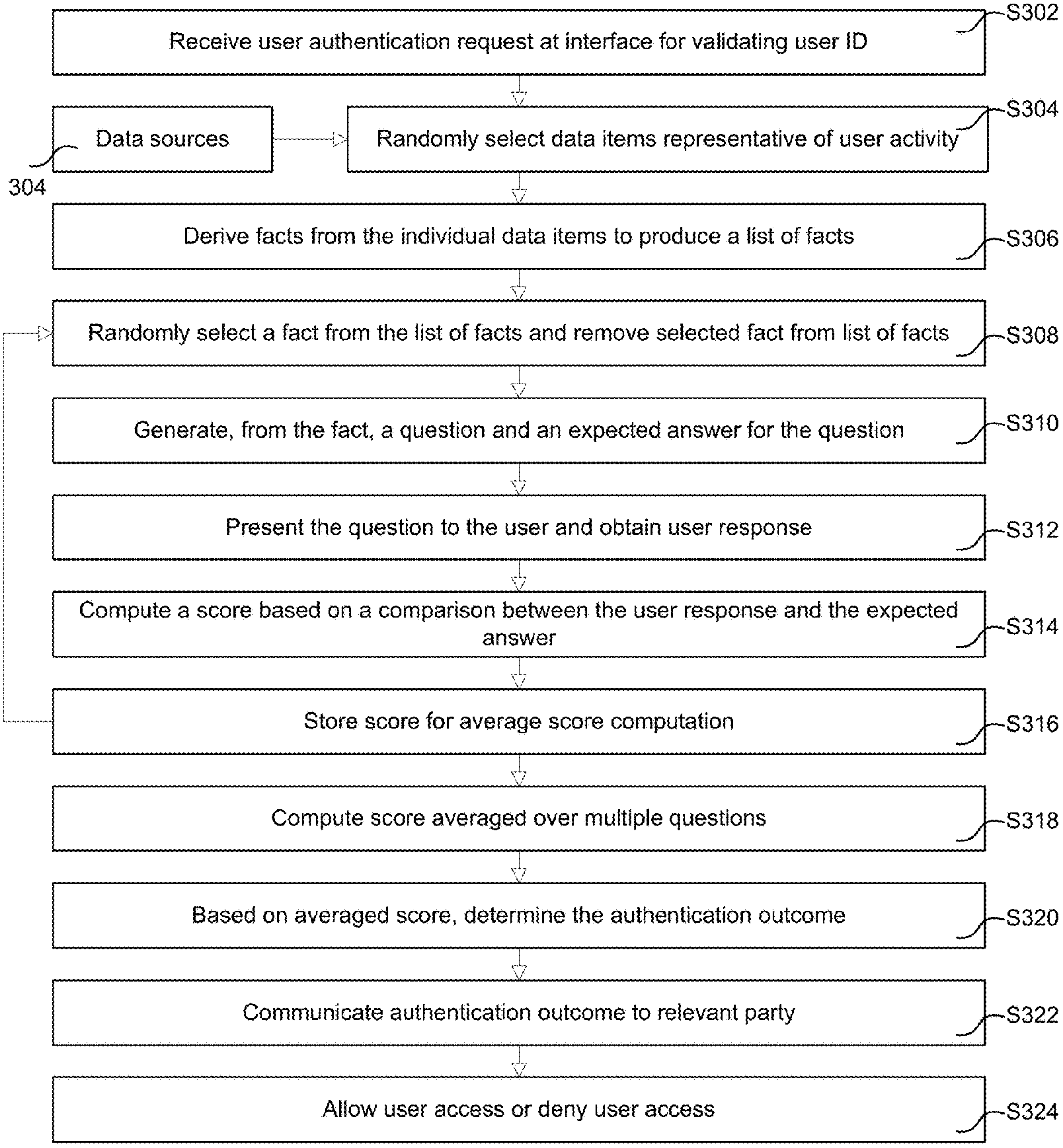
FIG. 3 shows a flow chart illustrating an example method of validating a user authentication request.

FIG. 3 shows a flow chart illustrating a method of validating a user authentication request. In step S302, the interface 104 receives a user authentication request, for example, from data access interface 108. In step S304, data items representative of a legitimate user's activity are randomly selected from data sources 304. In some embodiments, step S304 is performed in response to step S302 e.g., the data items representative of a legitimate user's activity is randomly selected from the data sources 304 in response to an authentication request being received at the interface 104. In other embodiments, step S304 is performed before step S302, e.g., data items representative of a legitimate user's activity are randomly selected from the data sources 304 and stored before a user authentication request is received. In either case, the authentication request is in some examples associated with a user identifier, which is matched to an identifier of a legitimate user held within the authentication system, enabling the authentication request to be processed based on the identified legitimate user's data. In some implementations step S304 is performed by the authentication system 105. In other implementations, step S304 is performed by the data access interface 108. In Step S306, facts are derived from the individual data items to produce a list of facts. In step S308, a fact is randomly selected from the list of facts. After a fact has been selected, the fact is removed so that the same fact is not selected again. In step S310, a question and an expected answer to the question are generated based on the randomly selected fact. In some embodiments, steps S306-S310 are performed by the authentication system 105. In some examples, the authentication system 105 uses the LLM 106 to perform steps S306 and S310. Using an LLM may involve generating a prompt that includes the fact and providing instructions for generating the fact. In step S312, the question is presented to the user via interface 104. In some examples, the user may responds to the question via the interface 104, for example by inputting, via a user input device, a user response in a relevant field displayed on the interface 104. The interface 104 provides the user response to the authentication system 105 for verification. In step S314, a score is computed based on a comparison between the user response and the expected answer. In step S316, the score for the question is stored for the average score computation. In some embodiments, steps S314 and S316 are performed by the authentication system 105. In some examples, steps S308-S316 are repeated several times, i.e., the user is presented with multiple questions, each generated by a randomly selected fact, and the individual scores corresponding to the multiple questions are stored. In step S318, an average score, averaged over multiple questions presented to the user, is computed. Based on the average score, an authentication outcome is determined. In one example, the authentication outcome is, for example, an instruction to allow or deny access to the user 102. In some examples, the authentication outcome is determined, by comparing the average score to a pre-defined threshold. In some embodiments, steps S318-S320 are performed by the authentication system 105. In some examples, the authentication system 105 uses the LLM 106 to perform steps S318-S320. In step S322, the authentication outcome is communicated to a relevant party. The relevant party may be the enterprise data provider 108 or the user 102, or both. In step S324, depending on the authentication outcome, the system 100 allows or denies the user 102 access to the system 100.

Figure 4:
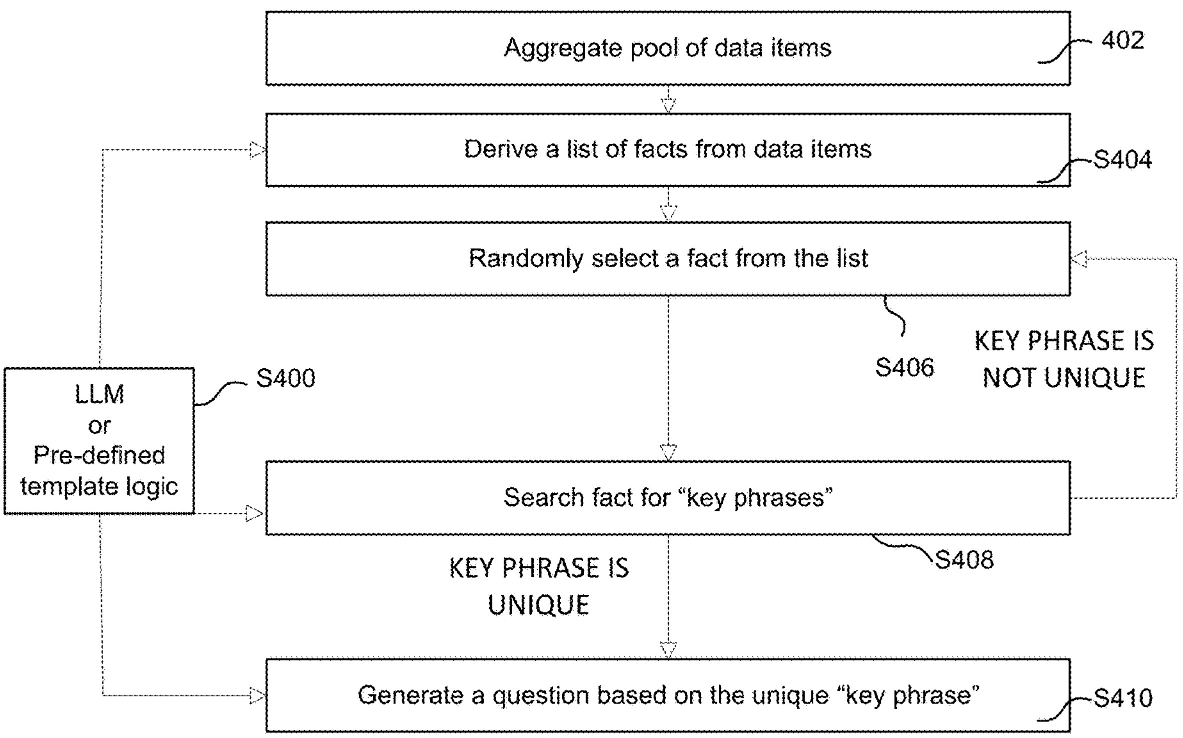
FIG. 4 shows a flow chart illustrating an example method of generating a question to be presented to user.

FIG. 4 shows a flow chart illustrating a method of generating a question to be presented to user. An aggregate pool of data items 402 is obtained as per the method illustrated in FIG. 2. In step S404 facts are derived from the data items to produce a list of facts. In step S406, a fact is randomly selected from the list of facts. In step S408, the fact is searched for key phrases. It is desirable that a fact produces a single unique key phrase so that a question may later be unambiguously derived from the fact. In the case that the key phrase extracted from the fact is unique, a question is generated in step S410 based on the unique key phrase. In the case that more than one key phrase is derived from the fact, i.e. the key phrase is not unique, steps S406-S410 are repeated, i.e., another fact is randomly selected from the list of facts, the fact is searched for a unique key phrase and a question is generated based on the unique key phrase. In case of multiple key phrases, each of which is unique, a sorting algorithm may be used (such as finding words least frequently used, or most unique, in a corpus of text) to select the most unique key phrase. Unique in this context refers to ambiguity. Therefore, there is a distinction between multiple unique key phrases (each of which is unambiguous, e.g. one relating to an unambiguous date of an activity, another relating to an unambiguous location), and multiple non-unique key-phrases (e.g. two contradictory key-phrases arising due to an ambiguous activity date). The steps S404-S410 are performed by the authentication system 105 in some implementations. Steps S404, S408, and S410 are performed in some embodiments by applying, in step S400 a pre-defined template logic for simple cases, or a machine learning (ML) method, such as an LLM for more ambiguous cases. For example, a pre-defined template logic associated with a date category may compute a score based on deviation between a date given in an answer and the expected date, allowing some leeway for approximate recollection by the end-user. The pre-define template logic or the LLM method is applied by the authentication system 105. In some embodiments utilizing an LLM, the authentication system 105 has access to an LLM method by an LLM 106. Some embodiments use templates in combination with LLM-based analysis.

Conventional solutions have a binary way of evaluating whether the answer given by the user completely matches the actual answer or not. The proposed solution on the other hand, gives a weighted score, and using these weighted scores, calculates an overall score. An administrator user (admin) can configure a threshold against which to evaluate the final score, to consider the user as authenticated or not. Additional metrics like typing speed, time-to-think can be incorporated to calculate the final score.

The methods below describe the scoring of the answer provided by an unverified user to a user identification validation question. If the answer provided does not match an expected answer to the question exactly, it is determined how close the two answers are. For example, an unverified user may provide the answer "20/3" to the user identity verification question "When was the date of travel?". This answer, "20/3" is then compared to the expected answer "$20^{th}$ March". An LLM may be instructed to perform such a comparison. For example, an LLM may be given the instruction: "Can $20^{th}$ March be written as "20/3". Answer in one word". The LLM in this case would respond with "Yes". A score is computed from the comparison. In an example scoring method, a score of 1 is attributed if the answer provided by the unverified user matches the expected answer to the user identification question presented. A fractional score is computed in the case that the answer provided by the unverified user does not match the expected answer to the user identification question presented. For example, if an unverified user provided the answer "19th March" to the question "When was the date of travel?", while the expected answer was "$20^{th}$ March", the answers do not match. An LLM instructed with the instruction "Can $20^{th}$ March" be written as "$19^{th}$ March. Answer in one word", would likely respond "No" when checking for equality. In case the unverified user answered incorrectly (i.e. a "No" is obtained from the above question), the solution compares how close the user's answer is to the actual answer and the score is incremented accordingly by a fractional score (between 0 to 1).

In some embodiments, the unverified user is presented with multiple questions, resulting in a series of scores, where each score lies between 0 to 1 (both included) obtained by the user's activity. An average of those scores is computed to obtain the final score of the user identity validation process. If the final score is greater than a pre-defined threshold (which could be admin configured), the user is authenticated, otherwise the user authentication is denied. In some examples, for the computation of the fractional score, an LLM is used to classify the expected answer into a pre-defined category, such as "distance", "time", "place", "object", etc. In some examples, an LLM is given the instruction "Categorise "$20^{th}$ March" as a place, or distance, or date, or time, or object. Answer in one word". The LLM would respond to the prompt in this example with "Date". Similarly, an LLM may be given the prompt "Classify "Eiffel Tower" as date, or time or place or person? Answer in one word." The LLM would respond with "Place". In one example, once the category of the expected answer is obtained, a pre-defined logic is used to compute the fractional score. In another example, the fractional score is computed by an LLM, which can handle ambiguous cases, undefined categories and information in different text formats.

An example pre-defined logic instruction to an LLM for a "Date" category could be "Give a score to "$18^{th}$ March" between 0 to 1, with the actual value being "$20^{th}$ March", and difference of each day decreases the score by 0.02, with "$20^{th}$ March having the score of 1. Answer in 1 word, a fraction". An answer to such a prompt by an LLM could be "0.96".

An example pre-defined logic instruction to an LLM for a "Time" category could be "Give a score to "15:00" between 0 to 1, with the actual value being "4:00 pm", and difference of each hour decreases the score by 0.1, with "4:00 pm" having the score of 1. Tell the fractional answer directly, in 1 word, without showing calculations." An answer to such a prompt by an LLM could be "The score for "15:00" (3:00 pm) based on the given criteria is 0.9".

An example of a pre-defined logic instruction to an LLM for a "Distance" category could be "Give a score to "385" between 0 to 1, with the actual value being "425", and difference of each number decreases the score by 0.01, with "425" having the score of 1. Tell the fractional answer directly, in 1 word, without showing calculations. An answer to such a prompt by an LLM could be "The score for "385" based on the given criteria is 0.6".

For certain categories, an LLM may not be needed to compute the fractional score. For instance, for names of persons/places, the score may be considered to be 1 in case the answer is correct, or 0 in case the answer is incorrect. Nevertheless, an LLM may still be instructed for such categories too. For example, an LLM may be instructed with the prompt "Does "Eiffel Tower" and "The Eiffel Tower" mean the same thing? Answer in one word". The LLM would respond with "Yes" in this example.

In some examples, questions are further scored based on the time taken by the end user to answer the individual questions, or all of them collectively, or the time taken by the end user to start typing an answer to a question.

Figure 5:
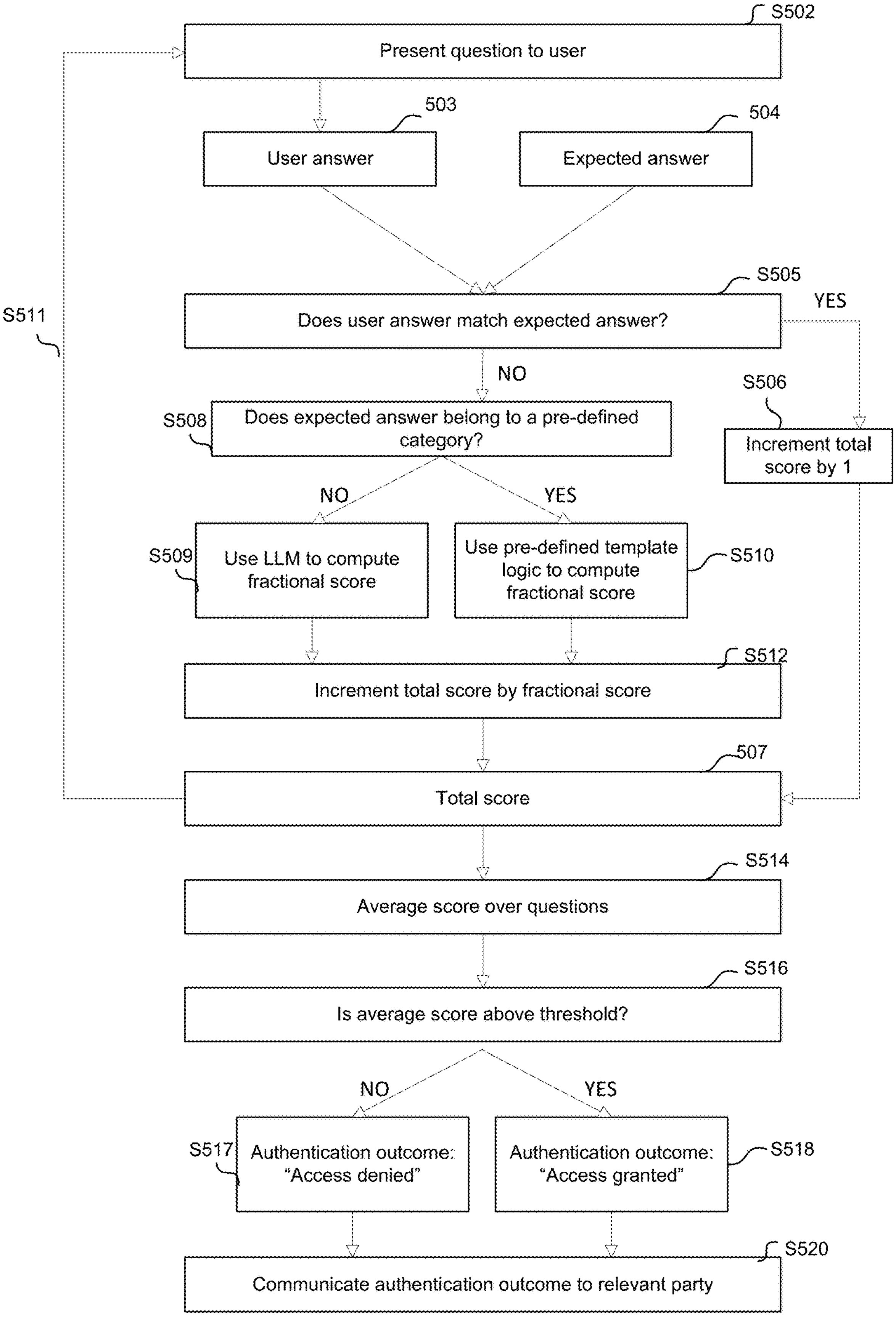
FIG. 5 shows a flow chart illustrating an example method of scoring a user's answers to identity validation questions.

FIG. 5 shows a flow chart illustrating a method of scoring a user's answers to identity validation questions. In step S502, a question, as generated by the method illustrated in FIG. 4 is presented to a user 102. In step S505, the user answer 503, provided by the user 102, is compared to the expected answer 504. In an example, the expected answer 504 is a unique key phrase as illustrated in FIG. 4. If the user answer 503 matches the expected answer 504, the total score 507 is incremented by some predetermined amount (e.g., by 1) in step S506. In the case that the user answer 503 does not match the expected answer 504, it is verified in step S508 whether the expected answer belongs to a pre-defined category. Examples of pre-defined categories are a place, a distance, a time, an object etc. In one example, in the case that the expected answer 504 belongs to a pre-defined category, a pre-defined template logic corresponding to the pre-defined category is used to compute a fractional score in step S510. In another example, in the case that the expected answer 504 belongs to a pre-defined category, an LLM is used to compute a fractional score in step S510. In the case that the expected answer 504 does not belong to a pre-defined category, an ML method such as an LLM is used to compute the fractional score in step S509. When an LLM is used for categories other than pre-defined categories, a question may be given to the LLM without any calculation hints; such as "How close is A to B? Return a value of 1 in case they are exactly same, or a value from 0 to 1 in case they are not exactly same, where the value defines their closeness". In this case, the LLM may use its own logic to return a fraction. In step S512, the total score 507 is incremented by the fractional score as obtained in step S509 or S510. In step S511, this method (steps S502-S512) is repeated a number of times. In step S514, the total score 507 is averaged over the number of questions. In step S516, the averaged score is compared to a pre-defined threshold. If the averaged score from step S514 is below the pre-defined threshold, then the authentication outcome is determined in step S517 as "access denied". This means that the user 102 has not answered the identity validation questions to the accuracy required to gain access to system 100. If the average score from step S514 is above the pre-defined threshold, then the authentication outcome is determined in step S518 as "access granted". This means that the user 102 has answered the identity validation questions to the accuracy required to gain access to system 100. In step S520, the outcome of the authentication process is communicated to a relevant party such as the user 102, the enterprise data provider 108 or both. In some embodiments, the steps S505-S520 are performed by the authentication system 105 in conjunction with the LLM 106. In this case, the authentication system 105 communicates the outcome from step S518 to the user 102 and/or the data access interface 108 via the interface 104.

Figure 6:
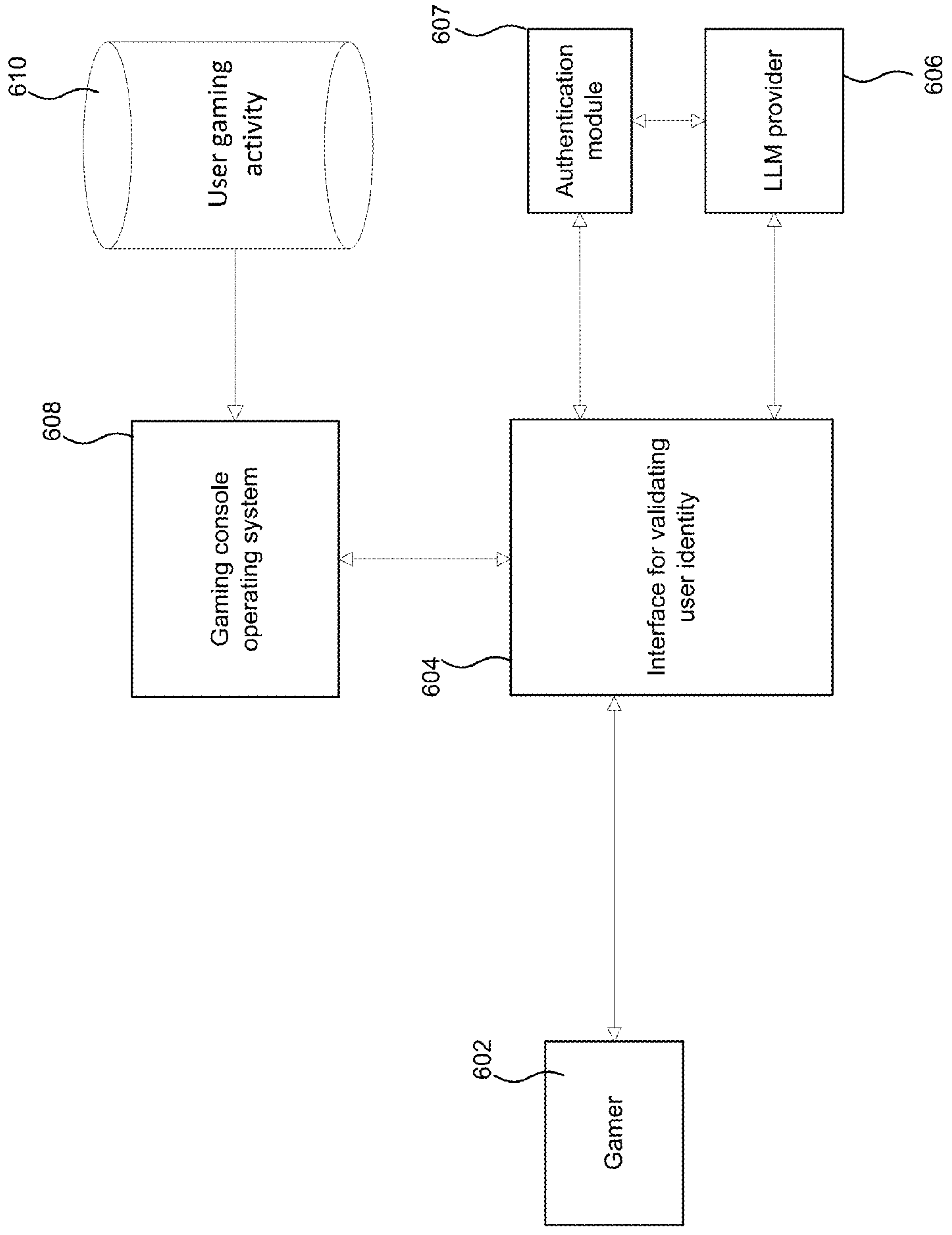
FIG. 6 shows a block diagram illustrating an example user identification validation system.

The methods of user identity validation described in FIGS. 2-5 are not limited to a system with an enterprise data provider. FIG. 6 shows a block diagram illustrating a user identification validation system 600 for a non-enterprise data provider such as a gaming console operating system 608. The methods of user identity validation described in FIGS. 2-5, as applied to the user 102 and the data access interface 108, apply analogously to a user such as gamer 602 attempting to gain access to a non-enterprise data provider system such as gaming console 608. The gamer 602 interacts with an interface 604 by providing information, for example, to request access to the system 600, or to respond to an identity verification request. In some examples, the interface 604 is a graphical user interface GUI which displays fields where the user inputs information via a user input device such as a gaming controller. In some examples, the interface 604 interacts with the user 602 by displaying information, for example, to request identity verification, or to display the result of an identity verification request. In some embodiments, a non-enterprise data provider such as the gaming console operating system 608 also interacts with the interface 604, for example, to place a user authentication request which is a request asking to verify that a user requesting access to the system 600 is a legitimate user of the system 600. The gaming console operating system 608 has access to user activity information such as user gaming activity belonging to a legitimate user of the system 600. In one example, the interface 604 interacts with a LLM provider 606 and an authentication system 105 607, for example, to process an authentication request. In one example, the LLM provider 606 and the authentication system 105 607 interact, for example to exchange information about an authentication request.

Example A comprises a computer-implemented authentication method, comprising receiving from an authentication requester an end-user authentication request, obtaining a data item representative of an activity associated with a legitimate user, deriving a fact from the data item, generating, from the fact: a question about the activity associated with the legitimate user, and an expected answer for the question based on the fact, causing the question to be outputted at a user interface, receiving an end-user response to the question, based on a comparison between the end-user response and the expected answer, determining an authentication outcome, and communicating the authentication outcome to the authentication requester.

Example B comprises the method of Example A, wherein a large language model (LLM) is used to derive the fact from the data item, generate, from the fact: the question, and the expected answer; or perform the comparison between the end-user response and the expected answer.

Example C comprises the method of claim Example A, wherein communicating the authentication outcome causes the authentication requester to permit or deny an end-user attempt to access to a secure system function.

Example D comprises the method of claim Example A, implemented in an authentication system, the method further comprising: obtaining a data source from a service remote from the authentication system; and extracting the data item from the data source.

Example E comprises the method of Example A, the method further comprising: obtaining a second data item representative of a second activity carried out by the legitimate user; and selecting, from a set comprising the data item and the second data item, the data item based on an importance weight associated with the data item and a second importance weight associated with the second data item.

Example F comprises the method of Example E, wherein the importance weight assigned to the data item is dependent on how recently the data item was created or on an interaction time associated with the data item; and the second importance weight assigned to the second data item is dependent on how recently the second data item was created or on an interaction time associated with the second data item.

Example G comprises the method of Example A, the method further comprising deriving the data item from a data source associated with the legitimate user, and storing the data item, prior to the authentication request being received.

Example H comprises the method of Example A, the method further comprising deriving the data item from a data source associated with the legitimate user based on the authentication request being received.

Example I comprises the method of Example A, wherein the expected answer to the question is a key-phrase derived from the fact, the method comprising determining that the key-phrase is unambiguous.

Example J comprises the method of Example I, wherein multiple unambiguous key-phrases are derived from the fact, and the method comprises using a sorting algorithm to select the key-phrase based on relative importance; or the fact is selected in response to deriving multiple ambiguous key-phrases from a different fact.

Example K comprises the method of Example J, wherein a Large Language Model (LLM) or a pre-defined logic are used in one or more of: deriving the fact from the data item; deriving a unique key phrase from the fact; generating, from the fact: a question, and an expected answer for the question based on the fact; computing a score based on a comparison between the end-user response and the expected answer.

Example L comprises the method of Example A, the method further comprising: computing a score based on a comparison between the end-user response and the expected answer obtaining a second data item representative of a second activity associated with a legitimate user activity; deriving a second fact from the second data item; generating, from the second fact: a second question about the second activity associated with the legitimate user, and a second expected answer for the second question based on the second fact; causing the second question to be outputted at the user interface; receiving a second end-user response to the second question; computing a second score, based on a comparison between the second end-user response and the second expected answer for the question; computing a final score based on the score and the second score.

Example M comprises the method of Example L, comprising calculating a total score, by incrementing the total score by a predetermined amount when the end-user response to a question matches the expected answer; and computing a fractional score when the end-user response to a question does not match the expected answer, based on a comparison between the end-user response and the expected answer; wherein the final score is computed based on the total score.

Example N comprises the method of Example M, the method further comprising using an LLM to classify the expected answer into a pre-defined category when the end-user response to a question does not match the expected answer, wherein a pre-defined template logic associated with the pre-defined category is used to compute the fractional score.

Example O comprises the method of Example N, wherein the LLM is used to compute the fractional score, the pre-defined template logic inputted to the LLM for use in computing the fractional score.

Example P comprises the method of Example L, wherein the authentication outcome is determined by comparing the final score to a pre-determined threshold.

Example Q comprises the method of Example A, wherein the authentication outcome is one of approving or rejecting the authentication request.

Example R comprises the method of Example A, wherein the authentication outcome is additionally based on an outcome of a credential verification method or a biometrics authentication method.

Example S comprises the method of Example A, wherein the user interface is a graphical user interface (GUI), the method comprising causing the GUI to display a field for receiving the end-user response.

Example T comprises the method of Example A, wherein the question is caused to be outputted based on matching a user identifier associated with the authentication request to an identifier of the legitimate user.

Example U comprises an authentication system, comprising: a memory configured to store computer-readable instructions; a processor coupled to the memory, and configured to execute the computer-readable instructions, which upon execution cause the processor to implement operations comprising: receiving from an authentication requester an end-user authentication request; obtaining a data item representative of an activity associated with a legitimate user; deriving a fact from the data item; generating, from the fact: a question about the activity associated with the legitimate user, and an expected answer for the question based on the fact; causing the question to be outputted at a user interface; receiving an end-user response to the question; based on a comparison between the end-user response and the expected answer, determining an authentication outcome, the authentication outcome being one of approving or rejecting the authentication request; and communicating the authentication outcome to the authentication requester.

Example V comprises the authentication system of Example U, wherein the authentication system is further configured to: implement the authentication requester, or receive the end-user authentication request from the authentication requester, which is implemented remotely from the authentication system.

Example W comprises a non-transitory medium comprising computer-readable instructions which, which upon execution on a processor, cause the processor to implement operations comprising: receiving from an authentication requester an end-user authentication request; obtaining a data item representative of an activity associated with a legitimate user; deriving a fact from the data item; generating, from the fact: a question about the activity associated with the legitimate user, and an expected answer for the question based on the fact; causing the question to be outputted at a user interface; receiving an end-user response to the question; based on a comparison between the end-user response and the expected answer, determining an authentication outcome, the authentication outcome being one of approving or rejecting the authentication request; and communicating the authentication outcome to the authentication requester.

Figure 7:
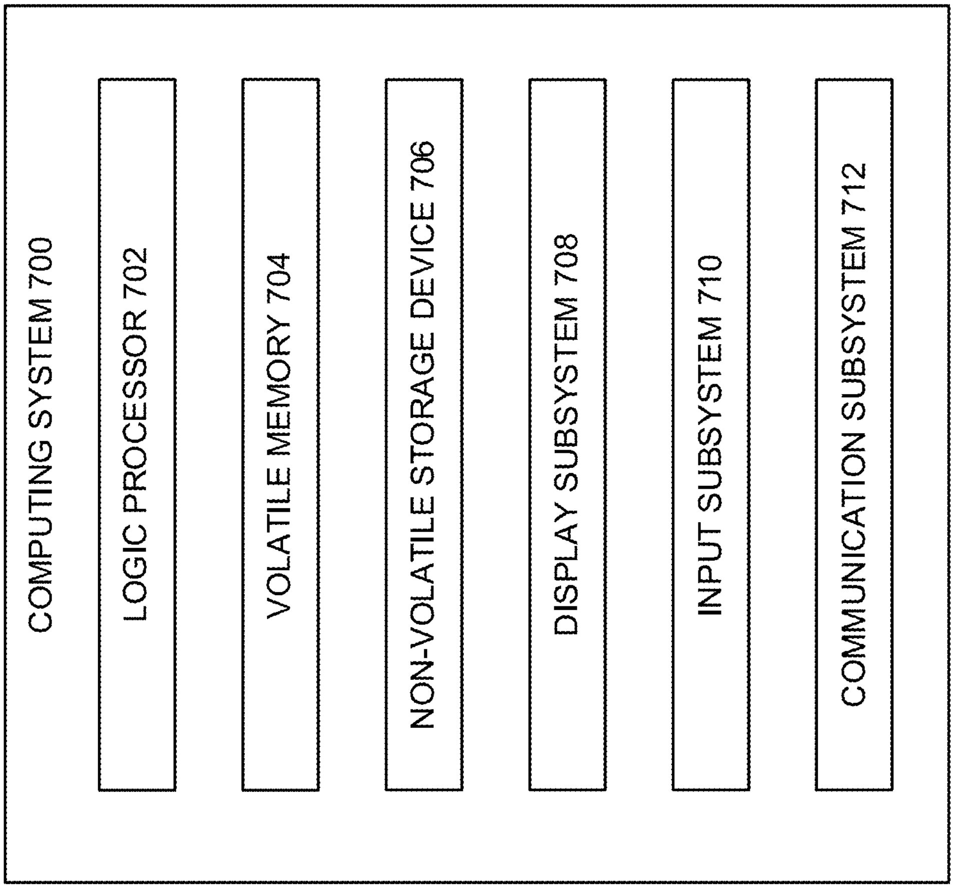
FIG. 7 schematically shows a non-limiting example of a computing system.

FIG. 7 schematically shows a non-limiting example of a computing system 700, such as a computing device or system of connected computing devices, that can enact one or more of the methods or processes described above, including the filtering of data and implementation of the structured knowledge base described above. Computing system 700 is shown in simplified form. Computing system 700 includes a logic processor 702, volatile memory 704, and a non-volatile storage device 706. Computing system 700 may optionally include a display subsystem 708, input subsystem 710, communication subsystem 712, and/or other components not shown in FIG. 7. Logic processor 702 comprises one or more physical (hardware) processors configured to carry out processing operations. For example, the logic processor 702 may be configured to execute instructions that are part of one or more applications, programs, routines, libraries, objects, components, data structures, or other logical constructs. The logic processor 702 may include one or more hardware processors configured to execute software instructions based on an instruction set architecture, such as a central processing unit (CPU), graphical processing unit (GPU) or other form of accelerator processor. Additionally, or alternatively, the logic processor 702 may include a hardware processor(s)) in the form of a logic circuit or firmware device configured to execute hardware-implemented logic (programmable or non-programmable) or firmware instructions. Processor(s) of the logic processor 702 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor 702 may be virtualized and executed by remotely accessible, networked computing devices configured in a cloud-computing configuration. In such a case, these virtualized aspects are run on different physical logic processors of various different machines. Non-volatile storage device 706 includes one or more physical devices configured to hold instructions executable by the logic processor 702 to implement the methods and processes described herein. When such methods and processes are implemented, the state of non-volatile storage device 706 may be transformed—e.g., to hold different data.

Non-volatile storage device 706 may include physical devices that are removable and/or built-in. Non-volatile storage device 706 may include optical memory (e g., CD, DVD, HD-DVD, Blu-Ray Disc, etc.), semiconductor memory (e g., ROM, EPROM, EEPROM, FLASH memory, etc.), and/or magnetic memory (e.g., hard-disk drive), or other mass storage device technology. Non-volatile storage device 706 may include non-volatile, dynamic, static, read/write, read-only, sequential-access, location-addressable, file-addressable, and/or content-addressable devices. Volatile memory 704 may include one or more physical devices that include random access memory. Volatile memory 704 is typically utilized by logic processor 702 to temporarily store information during processing of software instructions. Aspects of logic processor 702, volatile memory 704, and non-volatile storage device 706 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example. The terms "module," "program," and "engine" may be used to describe an aspect of computing system 700 typically implemented in software by a processor to perform a particular function using portions of volatile memory, which function involves transformative processing that specially configures the processor to perform the function. Thus, a module, program, or engine may be instantiated via logic processor 702 executing instructions held by non-volatile storage device 706, using portions of volatile memory 704. Different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc. When included, display subsystem 708 may be used to present a visual representation of data held by non-volatile storage device 706. The visual representation may take the form of a graphical user interface (GUI). As the herein-described methods and processes change the data held by the non-volatile storage device, and thus transform the state of the non-volatile storage device, the state of display subsystem 708 may likewise be transformed to visually represent changes in the underlying data. Display subsystem 708 may include one or more display devices utilizing virtually any type of technology. Such display devices may be combined with logic processor 702, volatile memory 704, and/or non-volatile storage device 706 in a shared enclosure, or such display devices may be peripheral display devices. When included, input subsystem 510 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor. When included, communication subsystem 712 may be configured to communicatively couple various computing devices described herein with each other, and with other devices. Communication subsystem 712 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 700 to send and/or receive messages to and/or from other devices via a network such as the internet. The term computer readable media as used herein includes computer storage media. Computer storage media includes for example volatile and non-volatile, removable and nonremovable media (e.g., volatile memory 704 or non-volatile storage 706) implemented in any method or technology for storage of information, such as computer readable instructions, data structures, or program modules. Computer storage media includes for example RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information, and which can be accessed by a computing device (e.g. the computing system 700 or a component device thereof). Computer storage media does not include a carrier wave or other propagated or modulated data signal. Communication media is embodied by computer readable instructions, data structures, program modules, or other data in a modulated data signal, such as a carrier wave or other transport mechanism, and includes any information delivery media. The term "modulated data signal" describes a signal that has one or more characteristics set or changed in such a manner as to encode information in the signal. By way of example, and not limitation, communication media includes wired media such as a wired network or direct wired connection, and wireless media such as acoustic, radio frequency (RF), infrared, and other wireless media.

The invention claimed is:

1. A computer-implemented authentication method, comprising:

receiving from an authentication requester an end-user authentication request;

obtaining, from a data store storing legitimate user data, a data item representative of a past activity associated with a legitimate user;

deriving a fact from the data item;

generating, from the fact:

a question about the past activity associated with the legitimate user, and an expected answer for the question based on the fact, the expected answer being based on a context and changing over a time period based on the past activity;

causing the question to be outputted at a user interface;

receiving an end-user response to the question;

based on a comparison between the end-user response and the expected answer, determining an authentication outcome; and communicating the authentication outcome to the authentication requester.

2. The method of claim 1, comprising:

computing a first score based on the comparison between the end-user response and the expected answer;

obtaining a second data item representative of a second activity associated with a legitimate user activity, the legitimate user activity being a second past activity associated with the legitimate user;

deriving a second fact from the second data item;

generating, from the second fact:

a second question about the second activity associated with the legitimate user, and a second expected answer for the second question based on the second fact;

causing the second question to be outputted at the user interface;

receiving a second end-user response to the second question;

computing a second score, based on a second comparison between the second end-user response and the second expected answer for the second question; and computing a final score based on the first score and the second score.

3. The method of claim 2, further comprising:

calculating a total score by incrementing the total score by a predetermined amount when:

the end-user response to the question matches the expected answer, or the second end-user response to the second question matches the second expected answer; and computing a fractional score when;

the end-user response to the question does not match the expected answer, or the second end-user response to the second question does not match the second expected answer, based on comparison between the end-user response and the expected answer or a second comparison between the second end-user response and the second expected answer; and wherein the final score is computed based on the total score.

4. The method of claim 3, comprising using a large language model (LLM) to classify the expected answer or the second expected answer into a pre-defined category when the end-user response to the question or the second end-user response to the second question does not match the expected answer or the second expected answer, wherein a pre-defined template logic associated with the pre-defined category is used to compute the fractional score.

5. The method of claim 4, wherein the LLM computes the fractional score using the pre-defined template logic as an input.

6. The method of claim 1, wherein the expected answer to the question is a key-phrase derived from the fact, and the method further comprises determining that the key-phrase is unambiguous; wherein:

an unambiguous key-phrase is a single unique key-phrase, and an ambiguous key-phrase is a non-unique key-phrase derived from the fact.

7. The method of claim 6, further comprising:

deriving a plurality of unambiguous key-phrases from the fact, and using a sorting algorithm to select the key-phrase from the plurality of unambiguous key-phrases based on relative importance; or responsive to deriving a plurality of ambiguous key-phrases from a different fact, selecting the key-phrase.

8. The method of claim 7, wherein a large language model (LLM) or a pre-defined logic are used in:

deriving the fact from the data item;

deriving a unique key phrase from the fact;

generating, from the fact:

the question, or the expected answer for the question based on the fact; or computing a score based on a comparison between the end-user response and the expected answer.

9. The method of claim 1, further comprising:

obtaining a second data item representative of a second activity carried out by the legitimate user; and selecting the data item or the second data item based on a first importance weight associated with the data item and a second importance weight associated with the second data item.

10. The method of claim 9, wherein the first importance weight assigned to the data item is dependent on:

how recently the data item was created, or an interaction time associated with the data item; and the second importance weight assigned to the second data item is dependent on;

how recently the second data item was created, or an interaction time associated with the second data item.

11. The method of claim 1, wherein a large language model (LLM) is used to:

derive the fact from the data item;

generate, from the fact:

the question, or the expected answer; or perform the comparison between the end-user response and the expected answer.

12. The method of claim 1, wherein;

the authentication requester is a component of a secure system communicatively coupled to an authentication system;

the method is performed at least in part by the authentication system; and communicating the authentication outcome causes the authentication requester to permit or deny an end-user attempt to access to a secure system function.

13. The method of claim 1 being implemented in an authentication system and further comprising:

obtaining a data source from a service, the service being remote from the authentication system; and extracting the data item from the data source.

14. The method of claim 1, further comprising:

deriving the data item from a data source associated with the legitimate user; and prior to receiving the end-user authentication request storing the data item.

15. The method of claim 1, further comprising:

based on the end-user authentication request being received, deriving the data item from a data source associated with the legitimate user.

16. The method of claim 1, wherein the authentication outcome comprises:

approving the end-user authentication request, or rejecting the end-user authentication request.

17. The method of claim 1, wherein;

the context includes an amount of the legitimate user data in the data store, or the authentication outcome is additionally based on an outcome of a credential verification method or a biometrics authentication method.

18. The method of claim 1, wherein the question is caused to be outputted based on matching a user identifier associated with the end-user authentication request to an identifier of the legitimate user.

19. An authentication system, comprising:

a processor coupled to a memory;

the memory storing computer-readable instructions;

the memory and the computer-readable instructions configured to cause the processor to perform operations comprising:

receiving from an authentication requester an end-user authentication request;

obtaining, from a data store storing legitimate user data, a data item representative of a past activity associated with a legitimate user;

deriving a fact from the data item;

generating, from the fact:

a question about the past activity associated with the legitimate user, and an expected answer for the question based on the fact, the expected answer being based on a context and changing over a time period based on the past activity;

causing the question to be outputted at a user interface;

receiving an end-user response to the question;

based on a comparison between the end-user response and the expected answer, determining an authentication outcome, the authentication outcome being one of approving or rejecting the end-user authentication request; and communicating the authentication outcome to the authentication requester.

20. A non-transitory medium comprising computer-readable instructions which, which upon execution by a processor, cause the processor to implement operations comprising:

receiving from an authentication requester an end-user authentication request;

obtaining, from a data store storing legitimate user data, a data item representative of a past activity associated with a legitimate user;

deriving a fact from the data item;

generating, from the fact:

a question about the activity associated with the legitimate user, and an expected answer for the question based on the fact, the expected answer being based on a context and changing over a time period based on the past activity;

receiving an end-user response to the question;

based on a comparison between the end-user response and the expected answer, determining an authentication outcome, the authentication outcome being one of approving or rejecting the end-user authentication request; and communicating the authentication outcome to the authentication requester.

* * * * *